United States Patent
Das et al.

(10) Patent No.: US 11,392,499 B2
(45) Date of Patent: Jul. 19, 2022

(54) DYNAMIC BUFFER CACHING OF STORAGE DEVICES

(71) Applicant: Kioxia Corporation, Tokyo (JP)

(72) Inventors: Saswati Das, San Jose, CA (US); Manish Kadam, San Jose, CA (US); Neil Buxton, Milton (GB)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 17/025,898

(22) Filed: Sep. 18, 2020

(65) Prior Publication Data

US 2022/0091984 A1    Mar. 24, 2022

(51) Int. Cl.
*G06F 12/0866* (2016.01)

(52) U.S. Cl.
CPC .... *G06F 12/0866* (2013.01); *G06F 2212/224* (2013.01); *G06F 2212/313* (2013.01)

(58) Field of Classification Search
CPC .......... G06F 12/0866; G06F 2212/224; G06F 2212/313; G06F 12/121–125
See application file for complete search history.

(56) References Cited

U.S. PATENT DOCUMENTS

| | | | | |
|---|---|---|---|---|
| 4,059,850 A * | 11/1977 | Van Eck | G06F 12/125 | 711/136 |
| 6,092,127 A * | 7/2000 | Tausheck | G06F 13/28 | 710/22 |
| 6,370,619 B1 * | 4/2002 | Ho | G06F 12/121 | 711/129 |
| 8,117,396 B1 * | 2/2012 | Fair | H04L 67/1097 | 711/133 |
| 10,423,541 B1 * | 9/2019 | Levin | G06F 12/08 | |
| 10,691,596 B2 * | 6/2020 | Gupta | G06F 12/0811 | |
| 2003/0149843 A1 * | 8/2003 | Jarvis | G06F 12/123 | 711/133 |
| 2009/0216936 A1 * | 8/2009 | Chu | G06F 12/0246 | 711/103 |
| 2014/0082288 A1 * | 3/2014 | Beard | G06F 3/0671 | 711/123 |

(Continued)

OTHER PUBLICATIONS

Yadgar, Gala, Michael Factor, and Assaf Schuster. "Karma: Know-It-All Replacement for a Multilevel Cache." Fast. vol. 7. 2007. (Year: 2007).*

(Continued)

*Primary Examiner* — Charles Rones
*Assistant Examiner* — Hewy H Li
(74) *Attorney, Agent, or Firm* — Foley & Lardner LLP

(57) ABSTRACT

Various implementations described herein relate to systems and methods for dynamically managing buffers of a storage device, including receiving, by a controller of the storage device from a host, information indicative of a frequency by which data stored in the storage device is accessed, and in response to receiving the information determining, by the controller, the order by which read buffers of the storage device are allocated for a next read command. The NAND read count of virtual Word-Lines (WLs) are also used to cache more frequently accessed WLs, thus proactively reducing read disturb and consequently increasing NAND reliability and NAND life.

20 Claims, 9 Drawing Sheets

(56) References Cited

U.S. PATENT DOCUMENTS

| | | | |
|---|---|---|---|
| 2015/0254186 A1* | 9/2015 | Sugimoto | G06F 3/0655 |
| | | | 711/103 |
| 2018/0157594 A1* | 6/2018 | Ash | G06F 12/0893 |
| 2019/0391930 A1* | 12/2019 | Gupta | G06F 12/123 |
| 2020/0026663 A1* | 1/2020 | Xu | G06F 12/122 |
| 2020/0201782 A1* | 6/2020 | Tsao | G06F 12/1027 |
| 2021/0263861 A1* | 8/2021 | Gupta | G06F 12/122 |

OTHER PUBLICATIONS

Jiang, Song, and Xiaodong Zhang. "LIRS: An efficient low inter-reference recency set replacement policy to improve buffer cache performance." ACM Sigmetrics Performance Evaluation Review 30.1 (2002): 31-42. (Year: 2002).*

* cited by examiner

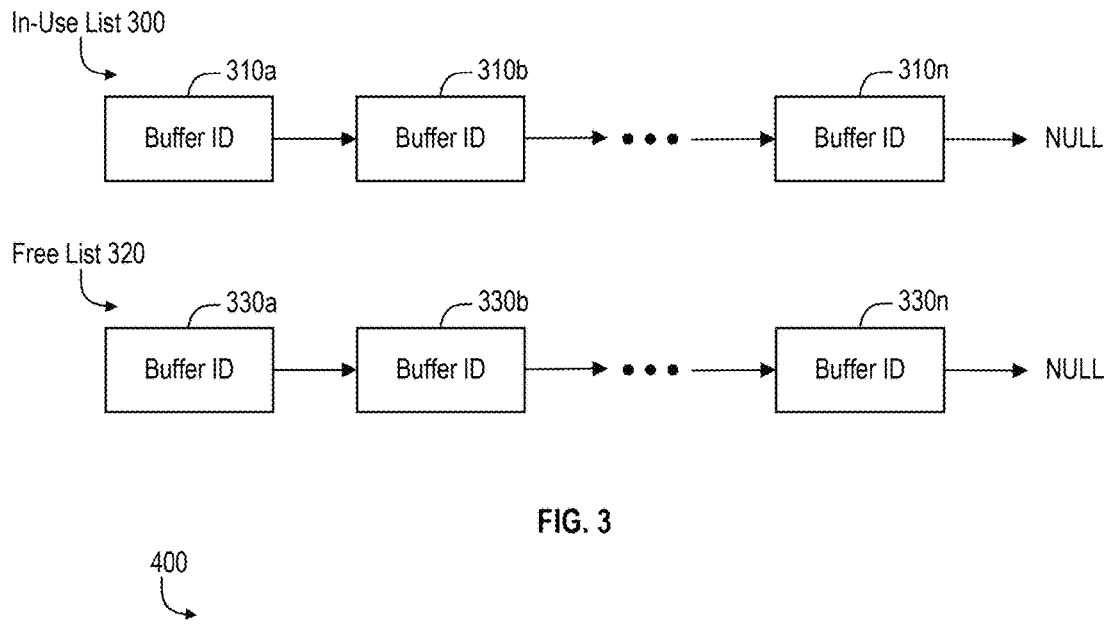

FIG. 3

| | Value | Definition |
|---|---|---|
| Access Frequency | 0 | No Frequency information provided |
| | 1 | Typical number of reads and writes expected for this LBA range |
| | 2 | Infrequent writes and infrequent reads to the LBA range indicated |
| | 3 | Infrequent writes and frequent reads to the LBA range indicated |
| | 4 | Frequent writes and infrequent reads to the LBA range indicated |
| | 5 | Frequent writes and frequent reads to the LBA range indicated |
| | 6 | One time read (e.g., command due to virus scan, backup, file copy, archive, etc.) |
| | 7 | Speculative read (e.g., command in prefetch operation) |
| | 8 | LBA range will be overwritten in near future |

| LCA | Read Buffer (ID) | List (In-Use / Free) | Total Read Count | Timestamp |
|---|---|---|---|---|
| LCA A | ID A | Free | $N_{total}$ A | $T_A$ |
| LCA B | ID B | In-Use | $N_{total}$ B | $T_B$ |
| ... | ... | ... | ... | ... |
| LCA N | ID N | Free | $N_{total}$ N | $T_N$ |

900b

| LCA | Read Buffer (ID) | List (In-Use / Free) | Total Read Count | Timestamp |
|---|---|---|---|---|
| 0xFFFFFFFF | INVALID | Free | 0 | 0 |
| 0xFFFFFFFF | INVALID | Free | 0 | 0 |
| 0xFFFFFFFF | INVALID | Free | 0 | 0 |
| 0xFFFFFFFF | INVALID | Free | 0 | 0 |

DYNAMIC BUFFER CACHING OF STORAGE DEVICES

TECHNICAL FIELD

The present disclosure generally relates generally to systems, methods, and non-transitory processor-readable media for implementing buffers in data storage devices.

BACKGROUND

In conventional read disturb algorithms for a Non-Volatile Memory (NVM) device, a read disturb counter is maintained for each memory page. Any page that is exceeds a read threshold (e.g., 64 K read) becomes a candidate for periodic read disturb checks of the integrity of the data in the page. These checks involve reading the data which will not only keep the dies and channels busy (thus decreasing random read performance) but also cause more read disturb effects. For example, any memory page in the NVM which exceeds a certain threshold of integrity checks becomes a candidate for read disturb refresh. and an entire superblock can be moved to a new block, causing write amplification. Excessive write amplification in a read intensive workload eventually reduces lifetime of the NVM. This approach does not take into account the use of memory buffers used in read operations to reduce read disturb.

SUMMARY

In some arrangements, a method includes receiving, by a controller of a storage device from a host, information indicative of a frequency by which data stored in the storage device is accessed, and in response to receiving the information, determining, by the controller, the order by which read buffers of the storage device are allocated for a next read command.

In some arrangements, a method, includes at least in part, using the total read counter of the read buffer, calculated by the controller of the storage device to determine the order by which read buffers of the storage device are arranged for being allocated for a next read command.

In some arrangements, a method used to calculate the total read count includes calculating the sum of the hit count of the read buffers, the actual read count of the memory pages in the NVM, and a high read count assigned by the controller of the storage device to frequently read data (as informed by the host), to determine the order by which read buffers of the storage device are allocated for a next read command.

In some arrangements, a non-transitory computer-readable media comprising computer-readable instructions, such that, when executed, causes a processor to receive, from a host, information indicative of a frequency by which data stored in the storage device is accessed and in response to receiving the information, determine the order by which read buffers of the storage device are allocated for a next read command.

BRIEF DESCRIPTION OF THE FIGURES

FIG. 3 is a block diagram illustrating an in-use list and a free list, according to some arrangements.

FIG. 4 is a table illustrating example access frequency values, according to the NVMe protocol.

DETAILED DESCRIPTION

Figure 1:
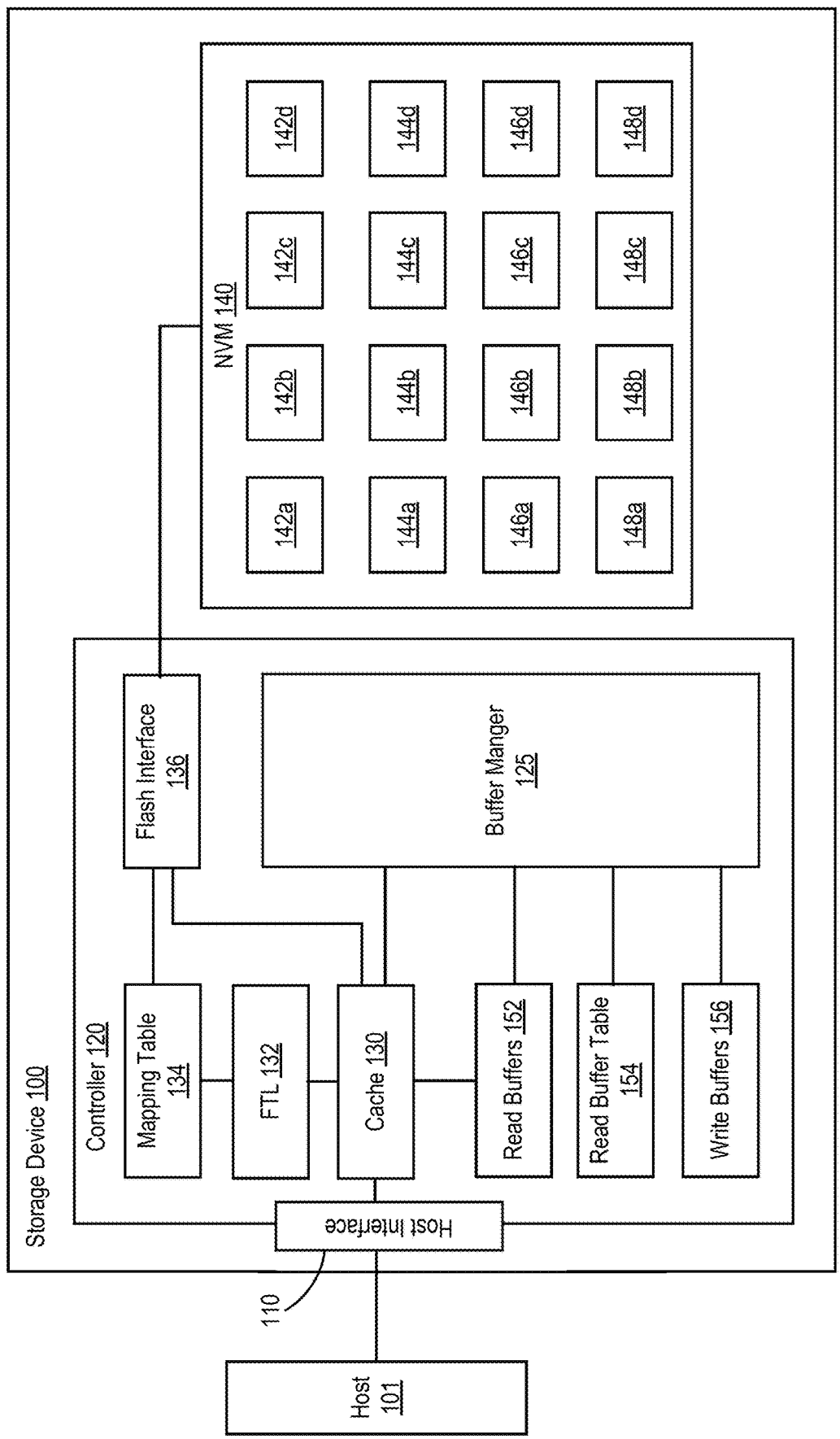
FIG. 1 shows a block diagram of an example storage device, according to some arrangements.

In conventional read disturb algorithms for a NVM device, a read disturb counter is maintained for each virtual Word-Line (WL) group. Any WL group that is exceeds a read threshold (e.g., 64 K read) becomes a candidate for scan read. Scan reads will not only keep the dies and channels busy (thus decreasing random read performance) but also cause more read disturb and trigger shift read retries, and eventually Vth recovery.

For example, at 600 K Input/Output Operations Per Second (IOPS) random read target performance, a scan read can be triggered every 107 ms. If a virtual Word-Line (WL) crosses threshold of 15 scan reads, read disturb can be triggered, and the entire superblock is moved to a new block of the NVM device, causing write amplification. Read disturb refresh or Vth recovery can additionally cause a SET of an Input/Output Determinism (IOD) device to undergo autonomous transition to a non-deterministic window.

Conventional reads check for pre-fetch only for sequential read. This increases throughput for sequential read but not random read or localized read. In addition, read buffers are conventionally released as soon as reads are completed. In other words, there is no improvement of NAND reliability for concentrated workloads using current read buffer design given that the current read buffer does not consider read disturbed WL in the NAND blocks to cache hot data. The current mechanisms used to avoid read disturb error is using scan read and read disturb reclaim. Read disturb reclaim refers to, generally, any anticipatory prevention procedure used to avoid data corruption by a read-disturb error. In this context, read disturb reclaim refers to moving the data to a new superblock when the number of scan reads in a virtual WL reaches a threshold. This approach of using scan reads decreases random read performance by keeping the dies and channels busy. Further reads and scan reads on those WL causes read disturb reclaim thus increasing write amplification of the drives.

Conventional read buffer does not use the access frequency information provided by the host to cache hot data, and therefore does not utilize metadata for improving management of the NVM memory and increasing read throughput.

Hence, the read buffer designs described herein utilize the read counter of the memory pages in NVM and the access frequency information provided by the host to cache hot data. This not only reduces read disturb in NVM thus enhancing NVM life but also increases throughput of concentrated random read workload.

The arrangements disclosed herein relate to systems, methods, and non-transitory processor-readable media directed to memory storage read buffers that proactively increase throughput of concentrated workloads and decrease read disturb scan read and superblock reclaim, therefore increasing longevity of NVM storage (e.g., NAND devices) by decreasing background activities. In some examples, early release of read buffers that fall in a virtual WL group having high read count is avoided. The read buffer disclosed herein can be managed in a scatter-gather fashion, with a combination of most frequently used and most recently used buffer policies for caching, thus increasing read throughput and reliability of the non-volatile memory storage by efficiently releasing read buffer.

In some arrangements, the read buffers are not immediately released upon completion of the read command, but are instead queued in a free list in a suitable order, such that before the read buffers are allocated for a new non-overlapping logical address, these read buffers can be used for caching to improve the latency of frequently read data and avoid long tail read latencies, especially for random and localized read commands. In practice, some data/metadata are read very frequently. After a miss from host buffer cache (if any), such data is conventionally read directly from the NAND, which causes read disturb. Without any mechanism to avoid further reads on the already disturbed WLs, further reads and scan such WLs causes the read levels to shift and thus reduce read determinism even in deterministic mode by triggering shift reads. Frequent shift read retries eventually trigger Vth error recovery causing autonomous transition to non-deterministic mode in IOD drives.

To assist in illustrating the present implementations, FIG. 1 shows a block diagram of a system including a storage device 100 coupled to a host 101 according to some implementations. In some examples, the host 101 can be a user device operated by a user. The host 101 may include an Operating System (OS), which is configured to provide a filesystem and applications that use the filesystem. The filesystem communicates with the storage device 100 (e.g., a controller 110 of the storage device 100) over a suitable wired or wireless communication link or network to manage storage of data in the storage device 100.

In that regard, the filesystem of the host 101 sends data to and receives data from the storage device 100 using a suitable host interface 110. The host interface 110 allows the software (e.g., the filesystem) of the host 101 to communicate with the storage device 100 (e.g., the controller 110). While the host interface 110 is conceptually shown as a block between the host 101 and the storage device 100, the host interface 110 can include one or more controllers, one or more namespaces, ports, transport mechanism, and connectivity thereof. To send and receive data, the software or filesystem of the host 101 communicates with the storage device 100 using a storage data transfer protocol running on the host interface 110. Examples of the protocol include but is not limited to, the Serial Attached Small Computer System Interface (SAS), Serial AT Attachment (SATA), and Non-Volatile Memory Express (NVMe) protocols. The host interface 110 includes hardware (e.g., controllers) implemented on the host 101, the storage device 100 (e.g., the controller 110), or another device operatively coupled to the host 101 and/or the storage device 100 via one or more suitable networks. The host interface 110 and the storage protocol running thereon also includes software and/or firmware executed on the hardware.

In some examples, the storage device 100 is located in a datacenter (not shown for brevity). The datacenter may include one or more platforms, each of which supports one or more storage devices (such as but not limited to, the storage device 100). In some implementations, the storage devices within a platform are connected to a Top of Rack (TOR) switch and can communicate with each other via the TOR switch or another suitable intra-platform communication mechanism. In some implementations, at least one router may facilitate communications among the storage devices in different platforms, racks, or cabinets via a suitable networking fabric. Examples of the storage device 100 include non-volatile devices such as but are not limited to, a Solid State Drive (SSD), a Non-Volatile Dual In-line Memory Module (NVDIMM), a Universal Flash Storage (UFS), a Secure Digital (SD) device, and so on.

The storage device 100 includes at least a controller 110 and a Non-Volatile Memory (NVM) 140. Other components of the storage device 100 are not shown for brevity. The NVM 140 includes NAND flash memory devices. Each of the NAND flash memory devices includes one or more of the NAND flash dies 142a-142d, 144a-144d, 146a-146d, and 148a-148d, which are NVM capable of retaining data without power. Thus, the NAND flash memory devices refer to multiple NAND flash memory devices or dies within the NVM 140. The NVM 140 can therefore be referred to a memory array of dies as shown. Each of the dies 142a-142d, 144a-144d, 146a-146d, and 148a-148d has one or more planes. Each plane has multiple blocks, and each block has multiple pages.

The dies 142a-142d, 144a-144d, 146a-146d, and 148a-148d can be arranged in one or more memory communication channels connected to the controller 120. For example, dies 142a-d can be configured on one memory channel, dies 144a-d on another, and so on. While the 16 dies 142a-142d, 144a-144d, 146a-146d, and 148a-148d are shown in FIG. 1, the NVM 140 can include any suitable number of NVM dies that are arranged in one or more channels in communication with the controller 120.

While the dies 142a-142d, 144a-144d, 146a-146d, and 148a-148d are shown as an example implementation of the NVM 140, other examples of NVM technologies for implementing the NVM 140 include but are not limited to, Magnetic Random Access Memory (MRAM), Phase Change Memory (PCM), Ferro-Electric RAM (FeRAM), Resistive RAM (ReRAM), and so on. The buffer mechanisms described herein can be likewise implemented on memory systems using such memory technologies and other suitable memory technologies.

Examples of the controller 110 include but are not limited to, an SSD controller (e.g., a client SSD controller, a datacenter SSD controller, an enterprise SSD controller, and so on), a UFS controller, or an SD controller, and so on.

The controller 110 can combine raw data storage in the dies 142a-142d, 144a-144d, 146a-146d, and 148a-148d such that those dies 142*a*-142*d*, 144*a*-144*d*, 146*a*-146*d*, and 148*a*-148*d* function as a single storage. The controller 110 can include processors, microcontrollers, central processing units (CPUs), a cache 130, buffers (e.g., buffers 152, 154, and 156), error correction systems, data encryption systems, a Flash Translation Layer (FTL) 132, a mapping table 134, a flash interface 136, and so on. Such functions can be implemented in hardware, software, and firmware or any combination thereof. In some arrangements, the software/firmware of the controller 110 can be stored in the NVM 140 or in any other suitable computer readable storage medium.

The controller 110 includes suitable processing and memory capabilities for executing functions described herein, among other functions. The controller 110 manages various features for the NVM 140, including but not limited to, I/O handling, reading, writing/programming, erasing, monitoring, logging, error handling, garbage collection, wear leveling, logical to physical address mapping, data protection (encryption/decryption), and the like. Thus, the controller 110 provides visibility to the dies 142*a*-142*d*, 144*a*-144*d*, 146*a*-146*d*, and 148*a*-148*d*.

Each of the cache 130, the read buffers 152, and the write buffers 156 is a local memory of the controller 110. In some examples, each of the cache 130, the read buffers 152, and the write buffers 156 includes one or more volatile storages. In some examples, each of the cache 130, the read buffers 152, and the write buffers 156 is a non-volatile persistent storage. Examples of each of the cache 130, the read buffers 152, and the write buffers 156 include but are not limited to, RAM, DRAM, Static RAM (SRAM), MRAM, PCM, and so on.

The read buffers 152 store data read from the NVM 140 in response to a read command from the host 101. The controller 120 can transfer the data from the read buffers 152 to the host 101 via the host interface 110. In some examples, data for each range of logical addresses is stored in one of the read buffers 152. After data is transferred to the host 101, each of the read buffers 152 can exist for a period of time before being used to cache data for another range of logical addresses. During that period of time, in response to receiving another read command for the same range of logical addresses, a hit on the read buffer has occurred, and the controller 120 can transfer the same data from that read buffer to the host 101, without having to read from the NVM 140. Arrangements disclosed herein relate to dynamically managing the read buffers 152, as disclosed in further detail herein.

The read buffer table 154 is used by the buffer manager 125 to managing dynamic allocation of the read buffers 152 as described in further detail herein. The read buffer table 154 can include various types of information for the read buffers, including but not limited to, the ranges of logical addresses, the read buffer Identifiers (IDs), list or buffer types, total read count, timestamps, and so on.

The write buffers 156 store data received from the host 101 (via the host interface 110). The controller 120 can write the data stored in the write buffers 156 to the NVM 140 (e.g., to the dies 142*a*-142*d*, 144*a*-144*d*, 146*a*-146*d*, and 148*a*-148*d*).

The buffer manager 125 include suitable hardware (e.g., one or more CPUs), software, and/or firmware configured for managing the cache 130, the read buffers 152, the read buffer table 154, and the write buffers 156. In some examples, the buffer manager 125 is implemented using dedicated hardware (e.g., dedicated processors, CPUs, and memories).

The mapping table 134 is an address mapping table (e.g., a Logic-to-Physical (L2P) mapping table). The FTL 132 (e.g., a FTL processor, a FTL interface module, and so on) can process the mapping table 134. The mapping table 134 is a mapping table that keeps records of the correspondence between logical addresses and physical addresses. For example, the mapping table 134 can translate read and write commands (received from the host 101) with respect to logical blocks/addresses into low-level commands that reference physical blocks/addresses. In some examples, a read or write command received from the host 101 includes a logical address such as but not limited to, a Logical Block Address (LBA). The LBA is a logical address that identifies a logical block, which may be a region or a sector. In some examples, a range of logical addresses refers to a range of multiple LBAs or a Logical Cluster Addresses (LCA). The mapping table 134 stores mapping between each logical address and one or more physical addresses (e.g., pages of a memory die) where data of the logical address is stored.

The FTL 132 can perform L2P operations based on the mapping table 134. For example, the FTL 132 can translate a logical address into a physical address, thus resolving the physical address corresponding to the logical address. Responsive to receiving a write or read command (containing a LCA therein) from the host 101, the FTL 132 can look up the physical address (e.g., a Media Cluster Address (MCA)) corresponding to the LCA by using the mapping table 132 in order to write to or read from the physical address. The mapping table 134 can be stored in one or more of the NVM 140, the cache 130, or a suitable memory of the controller 120.

The flash interface 136 (e.g., a Flash Interface Layer (FIL)) processes incoming flash commands from the FTL 132 in a command queue, schedules those commands in an optimal fashion for the destination physical memory die for the command.

In some examples, the controller 120 (e.g., the host interface 110) receives a read command from the host 101 and forwards the read command to the cache 130. The cache 130 sends the range of logical addresses to the buffer manager 125. The buffer manager 125 determines whether the range of logical addresses overlaps with a range of logical addresses corresponding to one of the read buffers 152 or the write buffers 156 (hit on a buffer). In response to determining whether a hit on one of the read buffers 152 or the write buffers 156 has occurred, the buffer manager 125 reports the hit result back to the cache 130. The buffer manager 125 manages the free list and the in-use list as described herein.

For a hit on one of the read buffers 152, the data is transferred to the host 101 from that read buffer, and the read command is completed. In response to determining that no hit on the read buffers 152 and the write buffers 156 has occurred, the FTL 132 determines a physical address corresponding to the range of logical addresses from the mapping table 134, and the read request is submitted to the NVM 140 via the flash interface 136. The flash interface 136 reads the data from the physical address of the NVM 140 and sends the data, a read count, and a scan read count to the cache 130. The cache 130 transfers the data to the host 101 (e.g., to a buffer of the host 101), determines and updates the total read count.

While the NVM 140 is presented as examples herein, the disclosed schemes can be implemented on any storage system or device that is connected to the host 101 over an interface, where such system temporarily or permanently stores data for the host 101 for later retrieval.

Figure 2:
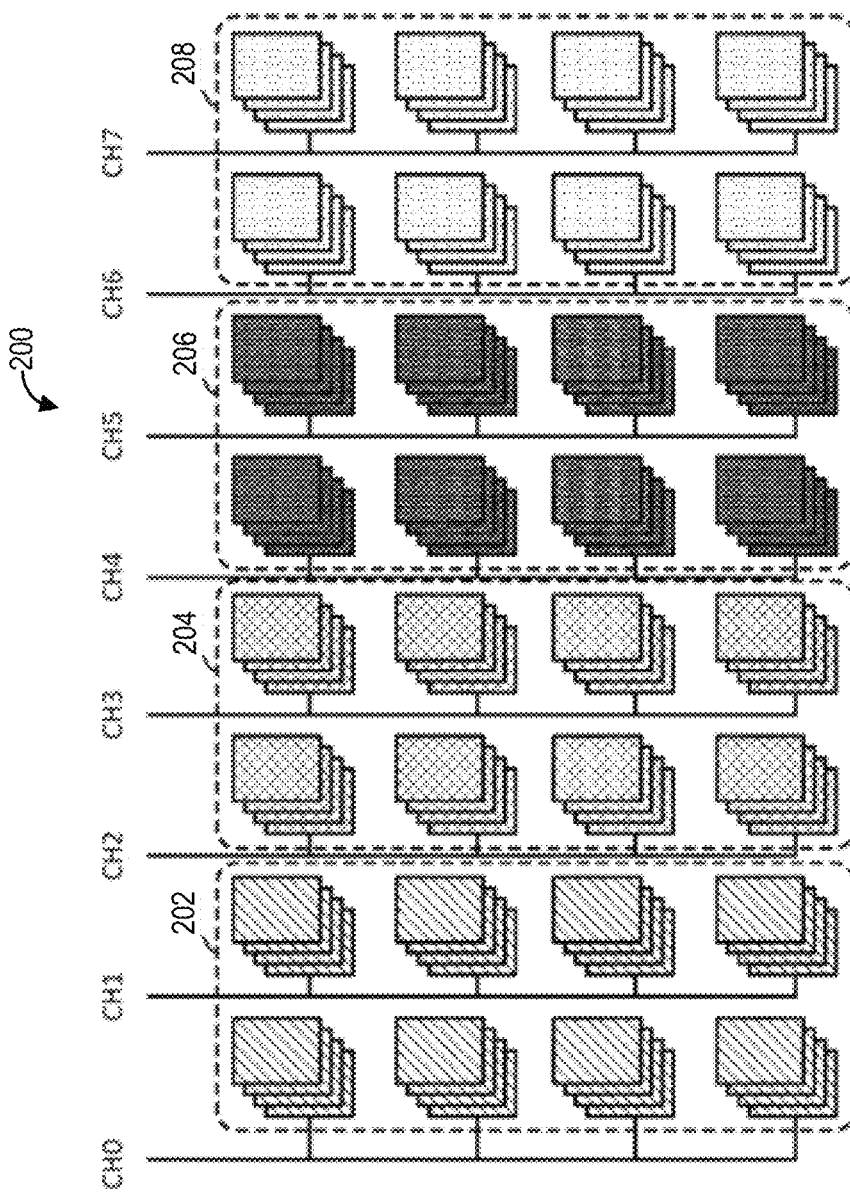
FIG. 2 is a block diagram of an architecture supporting low latency operation, according to some implementations.

FIG. 2 is a block diagram of an architecture 200 supporting low latency operation, according to some implementations. Referring to FIGS. 1 and 2, the architecture 200 can be configured from a non-volatile memory of a storage device such as but not limited to, the NVM 140. As shown in FIG. 2, the architecture 200 includes an array of 32 non-volatile memory dies are arranged across 8 channels (CH0-CH7), with 4 NVM dies coupled to each channel. In other words, the architecture 200 includes an array of NAND flash memory devices. Each of the NVM dies has one or more planes. Any suitable number of dies can be operatively coupled to any suitable number of channels. Each of the non-volatile memory dies in the architecture 200 can be one of the non-volatile memory dies 142a-142d, 144a-144d, 146a-146d, and 148a-148d. The channels CH0-CH7 can be a physical channel or a logical channel.

Rather than superblocks formed by selecting a physical block from each of the NVM dies across all 8 channels, the architecture 200 includes superblocks formed by selecting all of the physical blocks from each of the NVM dies on the same channel and an adjacent channel (denoted by the same shading). Each of these superblocks forms an isolation region (e.g., a region that is isolated form other regions) within the NVM 140 that is unaffected by channel I/O activity to other regions of the NVM 140, given that each region is accessed via channels which are not shared with other regions. Each isolation region can be referred to as a NVM set. Thus, in the architecture 200, an isolation region 202 includes the physical blocks of the non-volatile memory dies on the two channels CH0 and CH1. An isolation region 204 includes the physical blocks of the non-volatile memory dies on the two channels CH2 and CH3. An isolation region 206 includes the physical blocks of the non-volatile memory dies on the two channels CH4 and CH5. An isolation region 208 includes the physical blocks of the non-volatile memory dies on the two channels CH6 and CH7.

By configuring the superblocks using only the physical blocks from the NVM dies in a fixed number of separate channel(s) to form isolation regions, such as shown in FIG. 2, I/O operation collisions at the NVM dies and the channel controllers can be minimized or avoided altogether, allowing for lower latency, greater predictability, and more consistent I/O performance of the storage device. As shown, each of the isolation regions 202-208 includes the NVM dies coupled to multiple (e.g., two) channels, thus leveraging multiple channel controllers per isolation region to handle host I/O operations to improve throughput per isolation region. Alternatively, an isolation region can include NVM dies coupled to one channel. Accordingly, the dies of the architecture 200 can be selected and arranged to form the isolation regions 202-208, but in principle any number of channels may be used to form an isolation region, where separate isolation regions do not share channels.

In that regard, an IOD drive refer to an SSD that implement IOD features as described herein. Each NVM set is logically managed to be independent of the logics of other NVM sets of the IOD drive. That is, each physical petition of the IOD device is mapped to a logical petition of the IOD device. The IOD device can independently manage the logics performed on each NVM set and allocate the appropriate storage space and bandwidth to each NVM set. I/O operations with respect to a NVM set are guaranteed a certain level of bandwidth from the NVM set, independent of the other NVM sets, thus allowing latencies to be predictable to the host as the host is aware of the guaranteed bandwidth. The host 101 can therefore execute storage and compute functions using the IOD drives with the expectation of the guaranteed bandwidth, which can always be fulfilled due to the characteristics of IOD drives. Example architectures of the IOD devices can be found in U.S. Patent Pub. No. US 2019/0042150, titled "SSD ARCHITECTURE SUPPORTING LOW LATENCY OPERATION," filed on Nov. 1, 2017, which is hereby incorporated by reference in its entirety.

In some arrangements, in addition to the NAND read count and the read buffer (cache) hit count, the read buffers 152 can use an "Access Frequency" field in the read command of the host interface 110 (e.g., an NVMe transport layer) to determine the lifetimes of the read buffers 152 to increase hit ratio. The hit ratio refers to the ratio by which incoming read commands hit existing read buffers. In some arrangements, the host 101 can inform whether data is frequently read, and the read buffer cache can be scaled based on memory resource availability.

In an IOD drive that implements the read buffer systems disclosed herein, read determinism can be improved by reducing autonomous transitions to the Non-Deterministic Window (NDWIN). In particular, data determined to be frequently read are released last.

In one example, a 1-Terabyte (TB) drive with a NVM having a NAND die size of 512 Gigabyte (Gb) contains 16 parallel die. Given that 4 WLs are in one WL group, the total capacity of one virtual WL group is:

$$\text{Size of virtual } WL*4=16 \text{ KB}*3 \text{ } (LMU)*2 \text{ (planes)}=384 \text{ KB}$$

A read buffer size of 6 Megabytes (MB) can reduce read disturb scan read and avoid reclaim of at least 16 virtual WL groups (e.g., 6 MB/384 KB), i.e., 1 virtual WL group per die in the worst case scenario, in the scenario in which all the data in the WL group is hot data.

However, in some scenarios (for example a FTL implementation of a SSD to increase read throughput), at least all the lower pages (L) for a bank (herein a die across all the channels is referred to as a bank) are written (programmed) in sequence before the middle pages (M), and all the upper pages (U) of the bank are written in sequence after the middle pages are written in sequence. Thus, only one dual-plane page (e.g., 32 Kilobytes (KB)) in a virtual WL is hot data. Accordingly, a read buffer having a size of 6 MB can reduce scan read and reclaim of 192 virtual WL (e.g., 6 MB/32 KB). Such read buffer can cover 192/16=12 virtual WL per die.

From a performance perspective, with an effective channel speed of 640 MB/s, multi-plane read across 2 dies at 400 MB/s speed per channel is sufficient to keep the channel busy. As such, 3 MB (e.g., 16 KB page size*2 planes*16 channel*3) read buffer is sufficient to saturate the channel bandwidth for all the channels in a 16-channel configuration.

Therefore, if a total of 6 MB is allocated for read buffer for in a 16-channel drive, run time read buffer allocation can be throttled at 3 MB at higher queue depths without any loss of read performance, so that at any point in time 3 MB of frequently read data buffer can be solely dedicated to function as read cache, as described herein. With a total read buffer size of 36 MB, a total of 1152 (192*6) read disturbed WL groups can be cached at any point of time.

As described herein, a trade-off can be achieved between memory used for the read buffers 152 and tail read latencies/write amplification by determining a read buffer size based on the number of WL groups to be cached.

In some arrangements, the read buffer size can be defined based on a number of WL groups to be cached. In particular, the read buffer size can be defined according to available memory and a number of read disturbed WL groups to be cached.

Some arrangements are directed to a scatter gather buffer system in which an in-use list and a free list are maintained. FIG. 3 is a block diagram illustrating an in-use list 300 and a free list 320, according to some arrangements. Referring to FIG. 3, the read buffers 152 can be organized into the in-use list 300 and the free list 320. The in-use list 300 contains all allocated and in-use read buffers (currently used to transfer data from those in-use buffers to the host 101). The free list 320 contains all read buffers that can be occupied in response to receiving a new read command from the host 101. The in-use list 300 is a list of read buffers, each read buffer is identified by a corresponding buffer ID. As shown, the in-use list 300 includes buffer ID 310a, buffer ID 310b, . . . , buffer ID 310n. Each buffer ID is linked to the next buffer ID. For example, the first buffer ID, the buffer ID 310a, is linked to the second buffer ID 310b, and so on. The last buffer ID 310n is linked to NULL, indicating that the buffer ID 310n is the last buffer ID in the in-use list 300.

Similarly, the free list 320 is a list of read buffers, each read buffer is identified by a corresponding buffer ID. As shown, the free list 320 includes buffer ID 330a, buffer ID 330b, . . . , buffer ID 330n. Each buffer ID is linked to the next buffer ID. For example, the first buffer ID, the buffer ID 330a, is linked to the second buffer ID 330b, and so on. The last buffer ID 330n is linked to NULL, indicating that the buffer ID 330n is the last buffer ID in the free list 320. The read buffers are allocated from the head (e.g., the buffer ID 330a) of the free list 320. For example, in response to receiving a new read command for a non-overlapping range of logical addresses, the controller 120 (e.g., the buffer manager 125) allocates a read buffer that is the current head of the free list 320 and stores the data read from the NVM device in the read buffer. A non-overlapping range of logical addresses refers to a range that does not overlap with (not the same as) a range corresponding to a read buffer in the free list 320 and the in-use list 300. Thus, the non-overlapping range of logical addresses does not result in a hit on existing buffers.

In some arrangements, data that is frequently read are dynamically cached in the read buffers 152 using a field (e.g., an "Access Frequency" field) of a read command the host interface 110 (e.g., the NVMe spec) and a total read count. This ensures that more-frequently read data buffers are allocated for new non-overlapping reads only after the less-frequently used and unallocated data buffers are consumed.

The host 101 can indicate access frequency for any given range of logical addresses, for example, by sending information to the controller 120. Such information includes access frequency values indicative of access frequencies for the ranges of logical addresses. FIG. 4 is a table 400 illustrating example access frequency values, according to the NVMe standard protocol. The access frequency values can be defined by the host interface 110. The access frequency value is provided in the "Access Frequency" field in the read command. Each access frequency value maps to a corresponding definition indicative of access frequency (e.g., the frequency by which a range of logical addresses is read and/or written, otherwise referred to as expected read frequency and/or expected write frequency).

In response to receiving an access frequency value of 0 ("0000") for a range of logical addresses from the host 101, the controller 120 (e.g., the buffer manager 125) determines that no frequency information is provided by the host 101 for the range of logical addresses. In response to receiving an access frequency value of 1 ("0001") for a range of logical addresses from the host 101, the controller 120 (e.g., the buffer manager 125) determines that a typical (moderate) number of reads and writes is expected for the range of logical addresses.

In response to receiving an access frequency value of 2 ("0010") for a range of logical addresses from the host 101, the controller 120 (e.g., the buffer manager 125) determines that low numbers of reads and writes (e.g., infrequent writes and infrequent reads) are expected for the range of logical addresses. In response to receiving an access frequency value of 3 ("0011") for a range of logical addresses from the host 101, the controller 120 (e.g., the buffer manager 125) determines that a low number of writes (e.g., infrequent writes) and a high number of reads (e.g., frequent reads) are expected for the range of logical addresses.

In response to receiving an access frequency value of 4 ("0100") for a range of logical addresses from the host 101, the controller 120 (e.g., the buffer manager 125) determines that a low number of reads (e.g., infrequent reads) and a high number of writes (e.g., frequent writes) are expected for the range of logical addresses. In response to receiving an access frequency value of 5 ("0101") for a range of logical addresses from the host 101, the controller 120 (e.g., the buffer manager 125) determines that a high number of reads and writes (e.g., frequent reads and writes) are expected for the range of logical addresses.

In response to receiving an access frequency value of 6 ("0110") for a range of logical addresses from the host 101, the controller 120 (e.g., the buffer manager 125) determines that the command corresponding to the range of logical addresses is an one-time read command (e.g., the command is issued by the host 101 due to a virus scan, backup, file copy, archive, and so on). In response to receiving an access frequency value of 7 ("0111") for a range of logical addresses from the host 101, the controller 120 (e.g., the buffer manager 125) determines that the command corresponding to the range of logical addresses is a speculative read command (e.g., the command is issued by the host 101 for a pre-fetch operation). In response to receiving an access frequency value of 8 ("1000") for a range of logical addresses from the host 101, the controller 120 (e.g., the buffer manager 125) determines that the range of logical will be overwritten in the near future.

In some examples, in response to determining that the read buffer for a range of logical addresses has an access frequency value (e.g., access frequency value of 3) corresponding to frequent reads and infrequent writes, the buffer manager 125 assigns a high read count to the read buffer as the read buffer (identified by a buffer ID) is issued the first time. In some examples, the high read count is a read count of 64 K, which is considered to be a high read count from read disturb perspective. The read buffer is linked to the free list 320 according to the total read count.

On the other hand, in response to determining that the read buffer for a range of logical addresses (1) has an access frequency value (e.g., access frequency value of 2, 4, 6, or 7) corresponding to infrequent reads; (2) has an access frequency value (e.g., access frequency value of 5 or 8) corresponding frequent writes (frequent updates); or (3) is invalidated through a write or deallocate command, the buffer manager 125 places the read buffer corresponding to the range of logical addresses at the head (e.g., the buffer ID 330a) of the free list 320. In that regard, the data corresponding to the range of logical addresses is cached for a short amount of time. The rest of the read buffers in the free list 320 are linked in ascending order of the total read count, with the buffer (having the buffer ID 330*b*) having the least total read count immediately follows the buffer ID 330*a*, and the buffer (having the buffer ID 330*n*) having the most total read count immediately precedes NULL.

Such mechanism allows more frequently read data buffer to be allocated by new non-overlapping reads only after the less frequently read, frequently written, and/or unallocated data buffers are consumed in the free list 320.

In some arrangements, the controller 120 can save a timestamp corresponding to a read command. In one example, the controller 120 receives the timestamp from the host 101 with the read command. In this case, the timestamp is indicative of the time at which the read command has been issued by the host 101 (e.g., generation timestamp of the read command). In another example, the controller 120 determines the timestamp corresponding to the read command in response to receiving the read command from the host 101. In this case, the timestamp is indicative of the time at which the read command has been received by the controller 120. In some examples, the controller 120 can store the timestamp corresponding to each received read command in a read buffer table.

In some arrangements, once in a predetermined number of read buffer allocations, the oldest read buffer is allocated instead of the head of the free list 320. For example, assume that the total number of buffer count is N, after every (N/4)th read, the oldest buffer entry (e.g., the read buffer corresponding to the earliest timestamp) in the free list 320 is allocated for the next non-overlapping read, instead of allocating the buffer from the head of the free list 320. This allows the controller 120 to gradually evict read buffers from the free list 320 that have a high read count given that those read buffers may have been frequently read in the past but have not been accessed for a while, before evicting other read buffers that are currently being frequently read.

Figure 5:
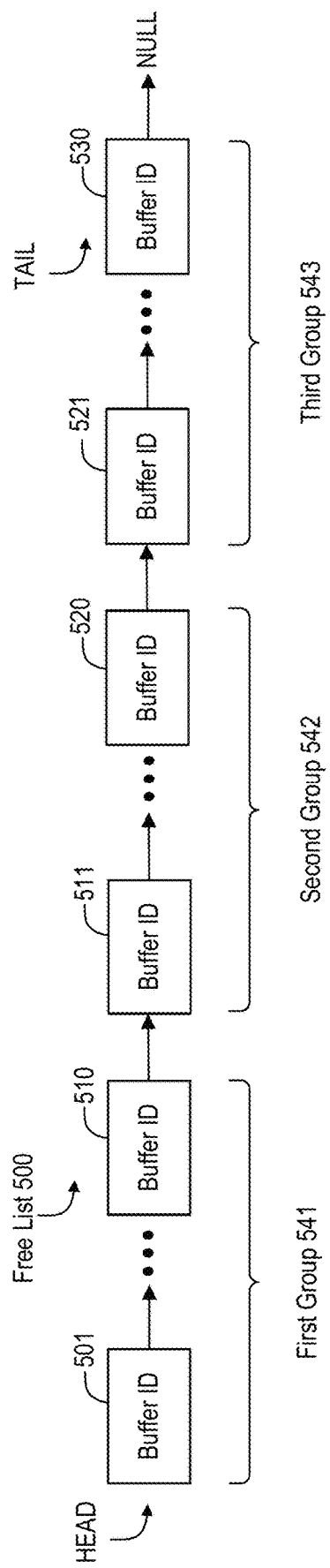
FIG. 5 is a block diagram illustrating a free list, according to some arrangements.

In that regard, FIG. 5 is a block diagram illustrating a free list 500, according to some arrangements. Referring to FIGS. 1-5, the free list 500 can be a list of buffers (buffer IDs) such as but not limited to, the free list 320. The free list 500 is a list of read buffers, each read buffer is identified by a corresponding buffer ID. As shown, the free list 500 includes buffer ID 501, . . . buffer ID 510, buffer ID 511, . . . , buffer ID 520, buffer ID 521, . . . , and buffer ID 530. Each buffer ID is linked to the next buffer ID. The last buffer ID 530 is linked to NULL, indicating that the buffer ID 530 is the last buffer ID and the tail of the free list 500. The read buffers are allocated from the head (e.g., the buffer ID 501) of the free list 500. For example, in response to receiving a read command for a non-overlapping range of logical addresses, the controller 120 allocates a read buffer that is the current head of the free list 500 and stores the data read from the NVM 140 in the read buffer. Thus, the read buffer having a buffer ID that is closer to the head of the free list 500 is allocated for a new read command before a buffer ID that is closer to the tail (NULL) of the free list 500.

In one example, the free list 500 contains read buffers belonging to three groups, e.g., a first group 541, a second group 542, and a third group 543. The first group 541 of the buffer IDs 501-510 is closer to the head of the free list 500 than the second group 542 and the third group 543, thus the buffer IDs 501-510 are allocated for new read commands before the buffer IDs 511-530 are allocated for new read commands. Each of the buffer IDs 501-510 in the first group 541 identifies a read buffer containing data that is no longer valid. For example, the host 101 can issue a write or deallocate command for a range of logical addresses, and as a result of executing the command, the data corresponding to the range of logical addresses that is in the read buffer is outdated and/or no longer needed. In that regard, such read buffers can be allocated first for new read commands and are therefore at the head of the free list 500.

The second group 542 of the buffer IDs 511-520 is closer to the head of the free list 500 than the third group 543, thus the buffer IDs 511-520 are allocated for new read commands before the buffer IDs 521-530 are allocated for new read commands. Each of the buffer IDs 511-520 in the second group 542 identifies a read buffer corresponding to a range of logical addresses deemed to associated with frequent writes and infrequent reads (e.g., with an access frequency value of 2, 4, 5, 6, 7, or 8 in the table 400). Frequent writes result in the data in the read buffer to be outdated. Thus, data corresponding to a range of logical addresses expected to experience both frequent writes and infrequent reads is likely not needed to be kept for a long period of time, and therefore can be allocated for new read commands after buffers in the first group 541 have been allocated for new read commands.

The buffer IDs 521-530 in the third group 541 are ordered according to the total read count. In some example, the buffers are arranged according to increasing total read count, with the buffer (e.g., buffer ID 521) with the lowest total read count being the closest to the head of the free list 500, and the buffer (e.g., buffer ID 530) with the highest total read count being closest to the tail of the free list 500. As described, a read buffer corresponding to a range of logical addresses expected to have a higher total read count (e.g., with an access frequency value of 3 in the table 400) is allocated for new read commands last, given the high likelihood of hits on such read buffer due to the frequent reads.

As described, in some examples, assuming that the total number of buffer IDs 501-530 is N, after every (N/4)th read, the buffer ID corresponding to the earliest timestamp in the free list 500 is allocated for the next non-overlapping read command, instead of allocating the buffer from the head of the free list 500.

Figure 6:
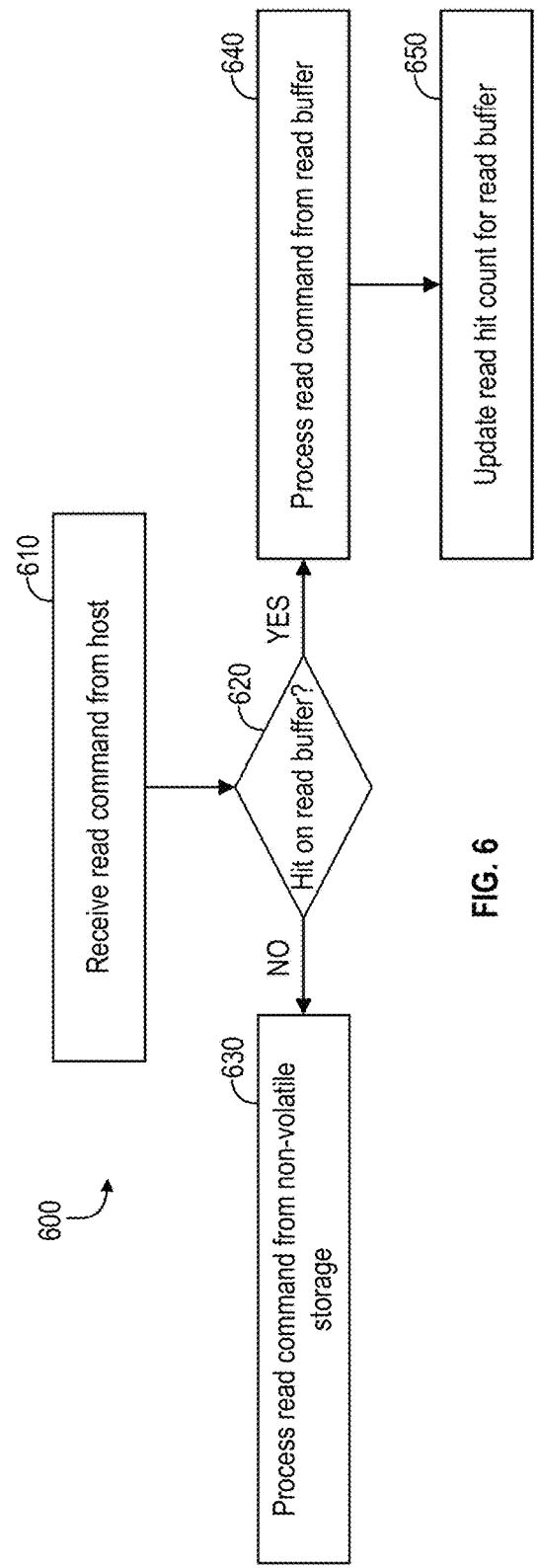
FIG. 6 is a flowchart diagram illustrating an example method for executing a read command, according to various arrangements.

FIG. 6 is a flowchart diagram illustrating an example method 600 for executing a read command, according to various arrangements. According to FIGS. 1-6, the method 600 can be executed by the controller 120. At 610, the controller 120 receives a read command from the host 101, via the host interface 110. At 620, the controller 120 determines whether the read command is a hit on a read buffer. A hit on a read buffer refers to a range of logical addresses in the read command corresponds to a read buffer in which up-to-date data for the range of logical addresses is already stored, such that the controller 120 can transfer the data from the read buffer instead of reading the data from the NVM 140.

In some arrangements, in response to the controller 120 determining a hit on a read buffer (620:YES), the controller 120 processes the read command from the read buffer at 640. On the other hand, in response to the controller 120 determining that there is no hit on a read buffer (620:NO), the controller 120 processes the read command from the NVM 140, at 630.

Figure 7:
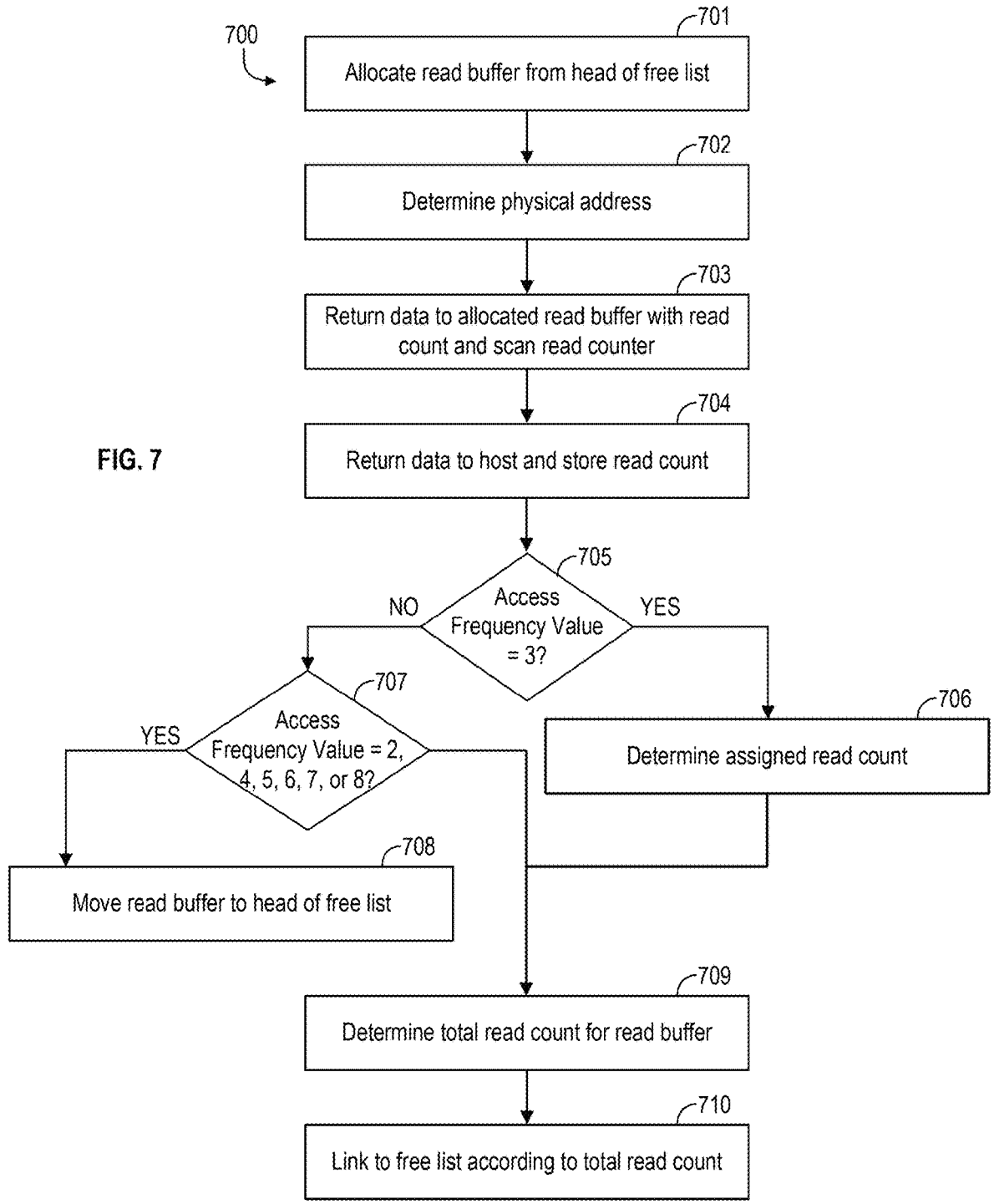
FIG. 7 is a flowchart diagram illustrating an example method for executing a read command (no read hit on read buffer), according to various arrangements.

FIG. 7 is a flowchart diagram illustrating an example method 700 for executing a read command, according to various arrangements. According to FIGS. 1-7, the method 700 can be executed by the controller 120 and is an example implementation of block 630. For example, in response to determining that the range of logical addresses does not result in a hit on any read buffer (620:NO), the controller 120 allocates a read buffer from the head of the free list 320, at 701.

At 702, the controller 120 determines one or more physical address corresponding to the range of logical addresses. For example, the controller 120 can obtain a MCA mapped to the range of logical addresses from an address mapping table (e.g., a L2P mapping table), and issues a request to read the data from the NVM 140 via a Flash Interface Layer (FIL). At 703, the controller 120 (e.g., the FIL) returns the data from the NVM 140 with a read count and a scan read count (e.g., 0-15) for the corresponding virtual WL in the NVM 140.

At 704, the controller 120 returns the data to the host 101 and stores a NAND read count for the read buffer. For example, the controller 120 can transfer the data from the read buffer to a buffer (e.g., a DRAM) of the host 101 via the host interface 110. In some examples, the NAND read count on the virtual WL ($N_{NAND}$) can be determined using expression (1):

$$N_{NAND}=N_{read\_count}+N_{scan\_read\_count}*64\text{ K} \quad (1);$$

where $N_{read\_count}$ refers to the read count on the virtual WL, and $N_{scan\_read\_count}$ refers to the scan read count on virtual WL.

At 705, the controller 120 determines whether the access frequency value is a first value (e.g., 3). As shown in the table 400, the access frequency value indicative of access frequency (e.g., read frequency and write frequency) can be received from the host 101. The access frequency value of 3 for a range of logical addresses corresponds to a low number of writes (e.g., infrequent writes) and a high number of reads (e.g., frequent reads) being expected for the range of logical addresses.

In response determining that the access frequency value is 3 (705:YES), the controller 120 determines an assigned read count for the range of logical addresses, at 706. In one example, in response to determining that an assigned read count for the range of logical addresses is currently 0, the controller 120 assigns a predetermined number (e.g., 64 K) as the assigned read count. On the other hand, in response to determining that the access frequency value is not 3 (705:NO), the controller 120 determines whether the access frequency value is a second value (e.g., 2, 4, 5, 6, 7, or 8), at 707.

In response to determining that the access frequency value is the second value (707:YES), at 708, the controller 120 moves the read buffer to the head of the free list 320 or moves the read buffer into the second group 542. For example, the buffer ID 330a identifies the read buffer allocated at 703. On the other hand, in response to determining that the access frequency value is not the second value (707:NO), at 709, the controller 120 determines a total read count for the read buffer allocated at 703. In some examples, the total read count ($N_{Total}$) of the read buffer can be determined using expression (2):

$$N_{Total}=N_{hit\_count}+N_{NAND}+N_{assigned} \quad (2);$$

where $N_{hit\_count}$ is the read hit count, and $N_{assigned}$ is the assigned read count. The total read count is stored in a read buffer table.

At 710, the controller 120 links the read buffer (e.g., the buffer ID thereof) in the free list 320 according to the total read count of the read buffer. In other words, the buffers in the free-list 320 with access frequency values other than 2, 4, 5, 6, 7, and 8 are arranged by total read counts, so that buffers with a lower number of total read count are closer to the head of the free list 320 (and are allocated first for the next use).

A buffer ID corresponding to the read buffer is linked or inserted between a first buffer ID and a second buffer ID, such that the first buffer ID having a total read count less than the total read count of the read buffer is closer to the head of the free list 320, and the second buffer ID having a total read count greater than the total read count of the read buffer is closer to the tail of the free list 320. This allows the read buffers with lower total read counts to be closer to the head of the free list 320.

The method 700 avoids further read disturbance on the WL corresponding to the data corresponding to logical addresses with higher read counts and avoids future scan read and read disturb reclaims on the superblock corresponding to those virtual WLs.

Figure 8:
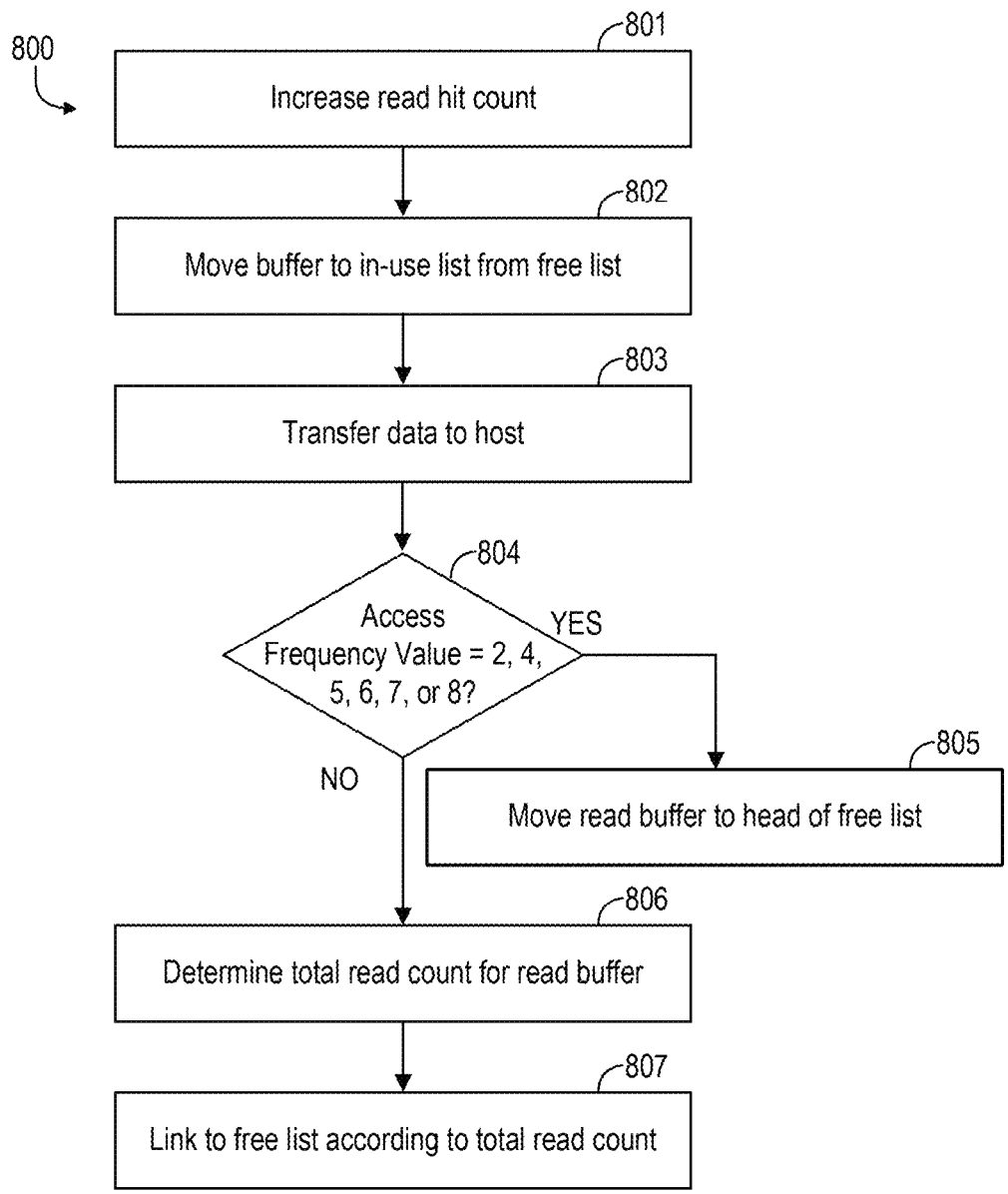
FIG. 8 is a flowchart diagram illustrating an example method for executing a read command (no read hit on read buffer), according to various arrangements.

FIG. 8 is a flowchart diagram illustrating an example method 800 for executing a read command, according to various arrangements. According to FIGS. 1-8, the method 800 can be executed by the controller 120 and is an example implementation of block 640. For example, in response to determining that the range of logical addresses results in a hit on any read buffer (620:YES), the controller 120 increases the read hit count (N hit count) for the read buffer at 801. The controller 120 can thus maintain a read hit count for each of buffers cached.

At 802, the controller 120 moves the read buffer from the free list 320 to the in-use list 300. At 803, the controller 120 transfers the data stored in the read buffer to a buffer (e.g., a DRAM) of the host 101 via the host interface 110. At 804, the controller 120 determines whether the access frequency value is a predetermined value (e.g., 2, 4, 5, 6, 7, or 8).

In response to determining that the access frequency value is the predetermined value (804:YES), at 805, the controller 120 moves the read buffer to the head of the free list 320. For example, the buffer ID 330a identifies the read buffer. On the other hand, in response to determining that the access frequency value is not the predetermined value (804:NO), at 806, the controller 120 determines the total read count for the read buffer. In some examples, the total read count (N Total) of the read buffer can be determined using expression (2), with the read hit count (N hit count) increased at 801. The total read count is stored in the read buffer table.

At 807, the controller 120 links the read buffer (e.g., the buffer ID thereof) in the free list 320 according to the total read count of the read buffer, such that the buffers in the free-list 320 are arranged by total read counts, so that buffers with a lower number of total read count are closer to the head of the free list 320 (and are allocated first for the next use).

In some example in which two or more read buffers have the same total read count, the read buffers having later timestamps are used to cache the read data, and the read buffers having earlier timestamps are linked closer to the head of the free list 320 (and are allocated before the read buffers having later timestamps for the next use).

Figures 9A, 9B, 10:
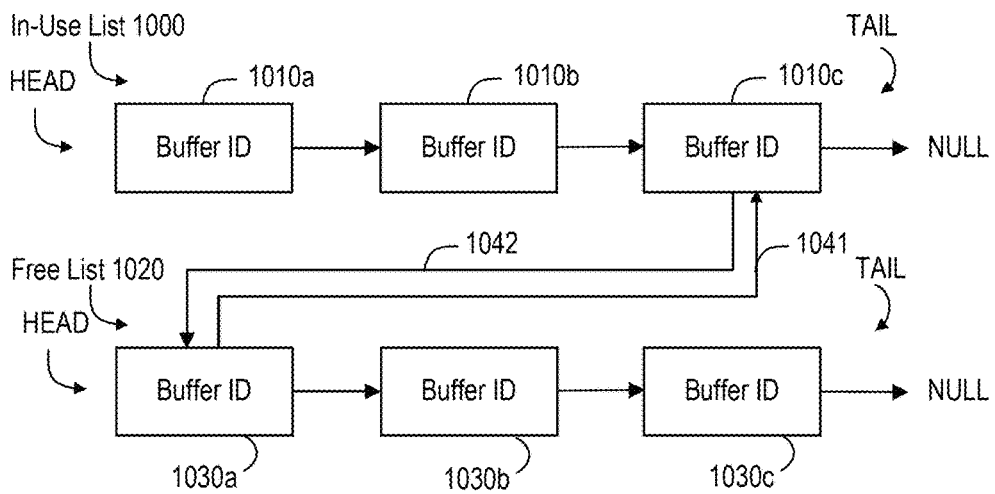
FIGS. 9A and 9B are example read buffer tables used to maintain the total read counts of read buffers, according to various arrangements.
FIG. 10 is a block diagram illustrating an example method for managing read buffers in an in-use list and a free list, according to various arrangements.

FIGS. 9A and 9B are example read buffer tables 900a and 900b used to maintain the total read counts of read buffers, according to various arrangements. Referring to FIGS. 1-9B, the read buffer tables 900a and 900b maintain a correspondence between ranges of logical addresses (e.g., LCAs), the read buffer IDs, list types (the in-use list 300 or the free list 320), the total read counts, and the timestamps. The read buffer table 900a is a snapshot of a read buffer table during operations of the storage device 100. The read buffer table 900b is the read buffer table initialized at boot-up.

In the arrangements in which the storage device 100 is an IOD storage device, the storage device 100 is either in Deterministic Window (DTWIN) or NDWIN. At boot up, all the read buffers will be in the free list 300, as shown in the read buffer table 900b.

In some arrangements, read buffer table search is enabled in both DTWIN and NDWIN. Given that the storage device 100 is mostly writing, deallocating, and performing background operations in NDWIN, in response to determining that a write or deallocate command hits on an LCA in the read buffer table 900a, the controller 120 can invalidate the entry corresponding to the LCA, and the entry is removed from the read buffer table 900a.

In the arrangements in which the storage device 100 is an IOD storage device, the DTWIN and NDWIN can alternate. At the start of the DTWIN, the controller 120 typically insert entries related to read buffers for LCAs corresponding to new, non-overlapping read commands. At the start of the NDWIN, the controller 120 typically invalidate entries related to read buffers for LCAs corresponding to overlapping write commands.

At boot up and in the scenario in which the storage device 100 is enabled for a predictable latency mode, the read buffer table 900b is initialized to invalid LCA (e.g., "0xFFFFFFFF"). As new read commands are received from the host 101 during the DTWIN, the read buffer table 900a can be searched first according to the range of logical addresses (e.g., the LCAs) associated with the read commands to determine whether a read buffer hit occurs. In response to determining that no read buffer hit occurs, the controller 120 populates a new entry in the read buffer table 900a with the range of logical address, the read buffer ID, list type, the total read count, and timestamp.

Furthermore, in response to receiving a read command from the host 101, the controller 120 searches the read buffer table 900a and determines a read buffer hit on an existing entry with the same range of logical addresses. If a read buffer hit is determined, the controller 120 increments the read hit count (thus increasing the total read count), sets the list type to in-use from free, moves the read buffer to the in-use list 300, and reads the existing data from the read buffer.

After a copy of the data is transferred to the host 101, the controller 120 relocates the read buffer back to the free list 320 according to the new access frequency and the updated total read count for the LCA, and updates the read buffer table 900a accordingly. This ensures that the free list 320 is dynamically sorted according to the access frequencies and total read counts of the read buffers, which may change during the operations of the storage device 100.

FIG. 10 is a block diagram illustrating an example method for managing read buffers in an in-use list 1000 and a free list 1020, according to various arrangements. Referring to FIGS. 1-10, the in-use list 1000 is an example implementation of the in-use list 300, and the free list 1020 is an example implementation of the free list 320.

The in-use list 1000 is a list of read buffers, each read buffer is identified by a corresponding buffer ID. As shown, the in-use list 1000 includes buffer ID 1010a, buffer ID 1010b, and buffer ID 1010c. Each buffer ID is linked to the next buffer ID. For example, the head of the in-use list 1000, the buffer ID 1010a, is linked to the second buffer ID 1010b, and which is linked to the last buffer ID 1010c. The last buffer ID 1010c is linked to NULL, indicating that the buffer ID 1010c is the tail of the in-use list 1000.

The free list 1020 is a list of read buffers, each read buffer is identified by a corresponding buffer ID. As shown, the free list 1020 includes buffer ID 1030a, buffer ID 1030b, and buffer ID 1030c. Each buffer ID is linked to the next buffer ID. For example, the head of the free list 1020, the buffer ID 1030a, is linked to the second buffer ID 1030b, and which is linked to the last buffer ID 1030c. The last buffer ID 1030c is linked to NULL, indicating that the buffer ID 1030c is the tail of the free list 1020.

In response to receiving a read command for a non-overlapping range of logical addresses (no hit on any buffer in the free list 1020 or the in-use list 1000), the controller 120 allocates a read buffer (e.g., corresponding to the buffer ID 1030a) that is the current head of the free list 1020. As described, in some examples, once in a predetermined number (e.g., N/4) of read buffer allocations, the oldest read buffer (e.g., the read buffer corresponding to the earliest timestamp) is allocated instead of the head of the free list 1020.

After being allocated, the read buffer identified by the buffer ID 1030a is moved from the free list 1020 to the in-use list 1000, at 1041. As shown, the buffer ID 1030a is moved to the tail of the in-use list 1000, as the buffer ID 1010c. The controller 120 issues the read command to the NVM 140, and stores the data read from the NVM 140 in that read buffer. After the controller 120 transfers the data from the read buffer (buffer ID 1010c) to the host 101, the controller 120 moves the read buffer (buffer ID 1010c) back to the free list 1020. In the example shown, in response to determining that the access frequency value is a predetermined number (e.g., the second value, 707:YES), the controller 120 moves the read buffer (buffer ID 1010c) to the head of the free list 1020, at 1042 (708), where the read buffer ID 1010c again corresponds to the read buffer ID 1030a. Alternatively, the controller 120 moves the read buffer (buffer ID 1010c) to into the second group 542. In other examples, as described, the controller 120 can move the read buffer (buffer ID 1010c) to the free list 1020 according to the updated total read count of the read buffer (buffer ID 1010c).

Figure 11:
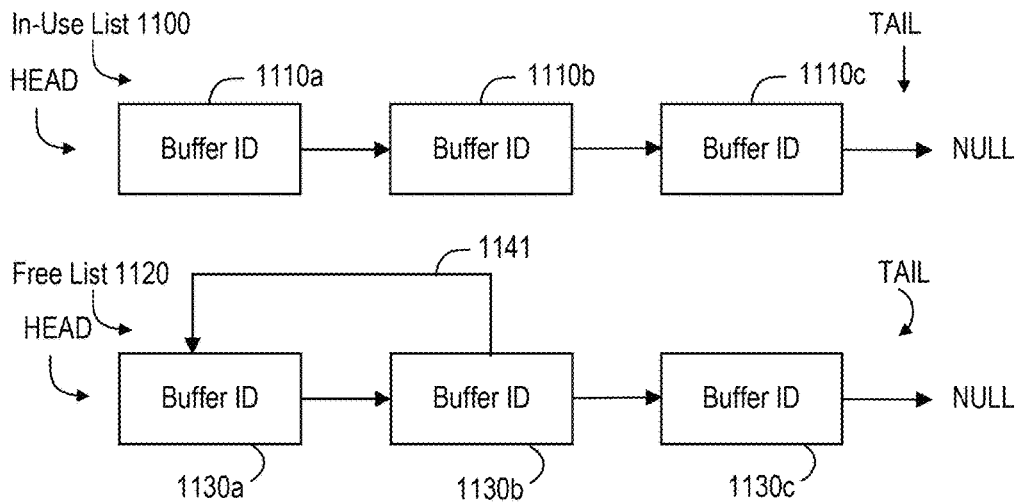
FIG. 11 is a block diagram illustrating an example method for managing read buffers in an in-use list and a free list when an overlapping write or deallocate command invalidates a buffer identifier (ID), according to various arrangements.

FIG. 11 is a block diagram illustrating an example method for managing read buffers in an in-use list 1100 and a free list 1120, according to various arrangements. Referring to FIGS. 1-11, the in-use list 1100 is an example implementation of the in-use list 300, and the free list 1120 is an example implementation of the free list 320.

The in-use list 1100 is a list of read buffers, each read buffer is identified by a corresponding buffer ID. As shown, the in-use list 1100 includes buffer ID 1110a, buffer ID 1110b, and buffer ID 1110c. Each buffer ID is linked to the next buffer ID. For example, the head of the in-use list 1100, the buffer ID 1110a, is linked to the second buffer ID 1110b, and which is linked to the last buffer ID 1110c. The last buffer ID 1110c is linked to NULL, indicating that the buffer ID 1110c is the tail of the in-use list 1100.

The free list 1120 is a list of read buffers, each read buffer is identified by a corresponding buffer ID. As shown, the free list 1120 includes buffer ID 1130a, buffer ID 1130b, and buffer ID 1130c. Each buffer ID is linked to the next buffer ID. For example, the head of the free list 1120, the buffer ID 1130a, is linked to the second buffer ID 1130b, and which is linked to the last buffer ID 1130c. The last buffer ID 1130c is linked to NULL, indicating that the buffer ID 1130c is the tail of the free list 1120.

In some arrangements, in response to receiving a new write or deallocate command during NDTWIN, the controller 120 searches the read buffer table 900a for read buffer hit. For example, the controller 120 can determine that the range of logical addresses (e.g., LCA) of the received write or deallocate command is the same as the range of logical addresses corresponding to buffer ID 1130b. In this case, the controller 120 writes the data to a write buffer cache. The controller 120 then invalidates the overlapping range of logical addresses and moves the corresponding read buffer ID 1130b to the head of the free list 1120 (as buffer ID 1130a), at 1141, to be consumed by the next non-overlapping read. The data in write buffer will be eventually written to the NVM 140.

In some arrangements, the read buffer table 900a can be populated and searched in response to receiving new read commands both in DTWIN and NDTWIN. Read hit on write buffers can be detected in parallel.

As read buffers are allocated from the start of the free list 320 for the non-overlapping read, the previous LCA entry for the buffer (if exists) can be removed from the read buffer table 900a and a new LCA entry is added to the read buffer table 900a along with the associated new total read count and timestamp.

Figure 12:
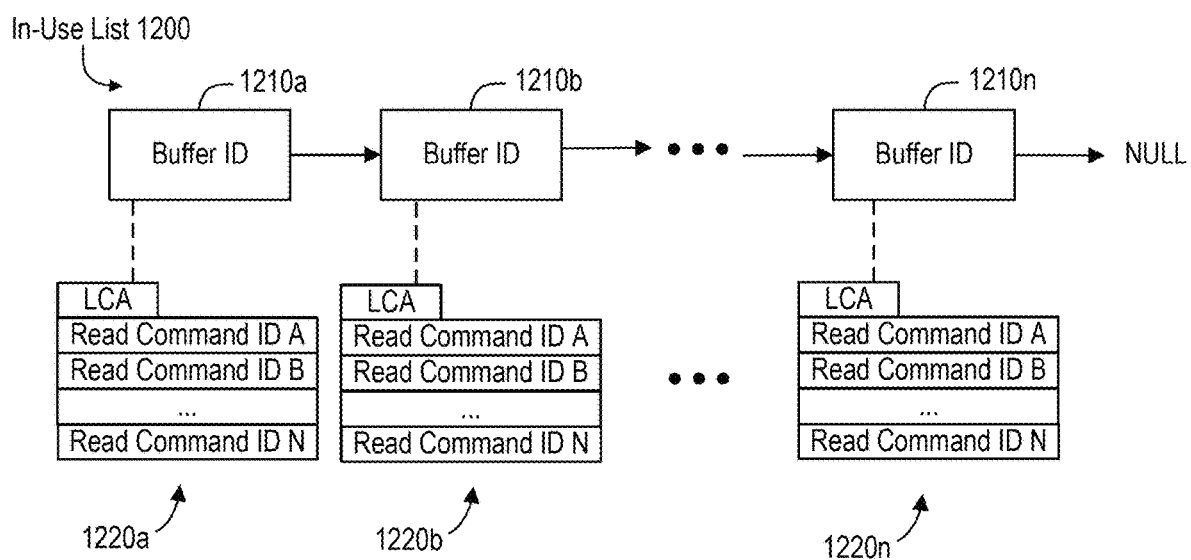
FIG. 12 is a block diagram illustrating an example wait read command ID list maintained for each buffer in the in-use list, according to various arrangements.

In some arrangements in which multiple hits on in-use buffers have been determined, those in-use read command IDs can be queued up using a linked list. FIG. 12 is a block diagram illustrating an example wait read command ID list maintained for each buffer identified in an in-use list 1200, according to various arrangements. Referring to FIGS. 1-12, the in-use list 1200 is a list of read buffers, including the read buffer IDs 1210a, 1210b, . . . , and 1210n as described herein. Each of the read buffer IDs 1210a, 1210b, and 1210n is linked to or includes a corresponding one of the wait read command ID lists 1210a, 1210b, . . . , and 1210n.

Each read command ID (e.g., read command ID A, read command ID B, . . . read command ID N) in the wait read command ID list 1210a corresponds to a read command received from the host 101 for the range of logical addresses (e.g., the LCA) of the buffer ID 1210a (e.g., a hit on the LCA of the buffer ID 1210a). As shown, the wait read command ID list 1220a includes the read command ID A, read command ID B, . . . and read command ID N. Each read command ID is linked to the next read command ID. For example, the head of the wait read command ID list 1220a, read command ID A, is linked to the second read command ID B, and so on. The last read command ID N is linked to NULL, indicating that the read command ID N is the tail of the wait read command list 1220a which has hit on the LCA corresponding to a particular read command ID. Each read command ID identifies a read command received by the controller 120 from the host 101. The read commands IDs A-N in the wait read command ID list 1220a can be queued according to timestamp of each of the read commands A-N. The read command (e.g., read command ID A) received earlier in time (earlier timestamp) is placed toward the head of the wait read command ID list 1220a. Other wait read command ID lists 1220b-1220n are similarly configured, as shown.

After the controller 120 transfers the data from the NVM to the read buffer corresponding to the buffer ID in the in-use buffer 300, all the read commands (identified by a corresponding read command ID) in the wait list 1200 for the same range of logical address can be served using the same buffer.

Given that an overlapping write command for a range of logical addresses invalidate entries corresponding to the same range of logical addresses from the read buffer table 900a as data is outdated due to the write, the controller 120 can search the read buffer table 900a table simultaneously with searching for read hit on write buffers. This improves the overall read latency.

Accordingly, as described herein, the present arrangements relate to read buffer mechanism that uses the "Access Frequency" field of the read commands to improve read performance. Thus, the access frequency values are metadata that can be used to improve performance and increase NAND life. The controller 120 can use the access frequency value in the "Access Frequency" field of the read command to manage the free list 320 such that read buffers caching frequently read data can be maintained for a longer period of time and frequently written and/or infrequently read data are released sooner, thus increasing throughput and decreasing latency of hot data.

In addition, the read hit count of the cached buffer and NAND read disturb read count of the WL group are used to determine the order of the read buffers in the free list 320, and are thus used to cache more frequently read data. This reduces read disturb scan read and read disturb reclaim, thus decreasing write amplification and increasing NAND life.

The implementation of the free buffer list to order the read buffers in accordance with most frequently used and the most recently used policy of caching allows efficiently release of the read buffers so that the read buffers can simultaneously act as dynamic read buffer cache. Thus implementing effective buffer allocation and release policy as described herein as well as read command chronology, read determinism can be improved in DTWIN and autonomous transition to NDWIN can be reduced.

Figure 13:
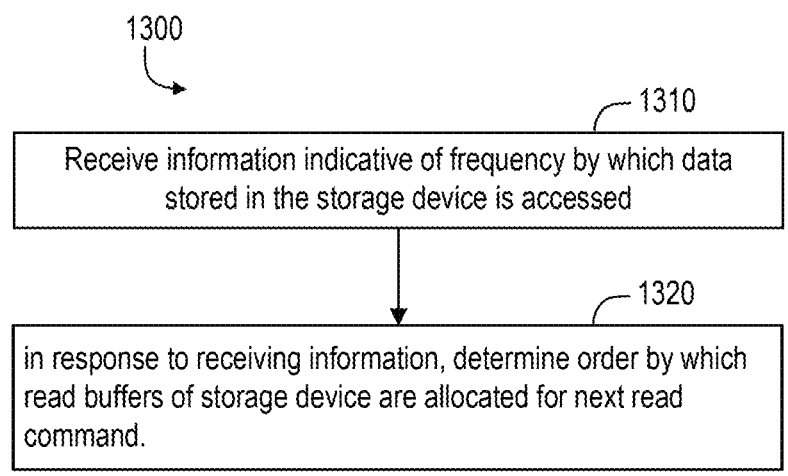
FIG. 13 is a flowchart diagram illustrating an example method for managing read buffers, according to various arrangements.

FIG. 13 is a flowchart diagram illustrating an example method 1300 for managing read buffers, according to various arrangements. Referring to FIGS. 1-13, the method 1300 can be performed by the controller 120.

At 1310, the controller 120 receives from the host 101 information indicative of a frequency by which data stored in the storage device 100 (e.g., the NVM 140) is accessed. At 1320, in response to receiving the information, the controller 120 (e.g., the buffer manager 125) determines the order by which read buffers 152 of the storage device 100 are allocated for a next read command. In some examples, determining the order by which read buffers 152 are allocated refers to determining an order of the read buffers 152 in the free list 320. Each read buffer in the free list 320 corresponds to a time to live, which is defined as the period of time between the completion of the read command (completing the transfer of data from the read buffer to the host 101) and being allocated for the next new read command of a different range of logical address. The read buffer being placed at or closer to the head of the free list 320 has a time to live shorter than that of another read buffer being placed at or closer to the tail of the read list 320.

In some arrangements, each of the read buffers 152 stores data corresponding to a range of logical addresses. The information indicative of the frequency by which the data is accessed includes an access frequency value (shown in the table 400) for the range of logical addresses of each of the read buffers 152. The controller 120 (e.g., the buffer manager 125) arranges the read buffers in the free list 320 based, at least in part, on the access frequency value corresponding to each of the read buffers 152.

In some examples, the access frequency value indicates one of an expected read frequency or a combination of the expected read frequency and expected write frequency. A read command corresponding to the range of logical addresses received from the host 101 includes the access frequency value.

In some examples, the read buffers 152 in the free list 320 are arranged according to a total read count for each of the read buffers 152. A first read buffer of the read buffers 152 having a higher total read count is allocated for a new read command after a second read buffer of the read buffers 152 having a lower total read count is allocated. The total read count for each of the read buffers 152 is a sum of a read hit count, a NAND read count, and an assigned read count. In some examples, a read buffer table 900a stores, for each of the read buffers 152, one or more of a range of logical addresses, a read buffer ID, a type of buffer, the total read count, and a timestamp.

In some examples, at least some of the read buffers 152 in the free list 320 are arranged according to a total read count for each of the read buffers. A first read buffer of the read buffers 152 having a higher total read count and an earlier timestamp is allocated for a new read command before a second read buffer of the read buffers 152 having a lower total read count and a later timestamp is allocated.

In some arrangements, the read buffers 152 in the free list 230 (500) includes the first group 541, the second group 542, and the third group 543. The first group 541 includes first read buffers (corresponding to buffer IDs 501-510) each corresponding to invalid data. The second group 542 includes second read buffers (corresponding to buffer IDs 511-520) each having an access frequency value (e.g., the access frequency value of 2, 4, 5, 6, 7, or 8 in the table 400) corresponding to frequent writes and infrequent reads. The third group 543 includes third read buffers (corresponding to buffer IDs 521-530) arranged according to a total read count for each of the third read buffers. In some examples, the third read buffers are allocated for new read commands after the first read buffers and the second read buffers are allocated. The second read buffers are allocated for new read commands after the first read buffers are allocated.

In some arrangements, in response to determining that a range of logical addresses of a new read command is different from that of any of the read buffers in the free list 320 (no hit on buffer, the range is non-overlapping), the controller 120 (the buffer manager 125) allocates a first read buffer from the free list 320. The controller 120 reads the data corresponding to the range of logical addresses of the new read command from the NVM 140 into the first read buffer. The controller 120 transfers the data from the first read buffer to the host 10.

In some examples in which the access frequency value (e.g., 3) in the new read command corresponds to frequent reads and infrequent writes, the controller 120 (the buffer manager 125) assigns the first read buffer a high assigned read count. After transferring the data to the host 101, the controller 120 (the buffer manager 125) adds the first read buffer back to the free list 320 according to a total read count of the first read buffer determined based at least in part of the high read count.

In some examples in which the access frequency value (e.g., 2, 4, 5, 6, 7, or 8) in the new read command corresponds to one or more of infrequent reads or frequent writes, the controller 120 (the buffer manager 125) adds the first read buffer back to the second group of the free list 320 after transferring the data to the host 101.

In some examples in which the access frequency value (e.g., 0 or 1) in the new read command corresponds to no frequency information provided or a typical number of reads and writes, the controller 120 (the buffer manager 125) adds the first read buffer back to the free list 230 according to a total read count of the first read buffer after transferring the data to the host 101.

In some arrangements, in response to determining that the range of logical addresses of a new read command is the same as a range of logical addresses of a first read buffer of the read buffers in the free list, the controller 120 (the buffer manager 125) increases a read hit count of the first read buffer is increased.

In some examples in which the access frequency value (e.g., 2, 4, 5, 6, 7, or 8) in the new read command corresponds to one or more of infrequent reads or frequent writes, the controller 120 (the buffer manager 125) adds the first read buffer back to the second group of the free list 320 after transferring the data to the host 101.

In some examples in which the access frequency value (e.g., 0 or 1) in the new read command corresponds to no frequency information provided or a typical number of reads and writes, the controller 120 (the buffer manager 125) adds the first read buffer back to the free list 230 according to a total read count of the first read buffer after transferring the data to the host 101.

In some examples in which the access frequency value (e.g., 3) in the new read command corresponds to frequent reads and infrequent writes, the controller 120 (the buffer manager 125) adds the first read buffer back to the free list 320 according to a total read count of the first read buffer after transferring the data to the host 101.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storages, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method, comprising:
   receiving, by a controller of a storage device from a host, information indicative of a frequency by which data stored in the storage device is accessed; and
   in response to receiving the information, determining, by the controller, the order by which read buffers of the storage device are allocated for a next read command,
   wherein each of the read buffers has a corresponding ID, and
   wherein determining the order includes linking a next one of the read buffers to a previous one of the read buffers using the corresponding ID of the next one of the read buffers.

2. The method of claim 1, wherein each of the read buffers stores data corresponding to a range of logical addresses;
   the information indicative of the frequency by which the data is accessed comprises an access frequency value for the range of logical addresses of each of the read buffers; and
   the method further comprises arranging, by the controller, the read buffers in a free list based, at least in part, on the access frequency value corresponding to each of the read buffers.

3. The method of claim 2, wherein
   the access frequency value indicates one of an expected read frequency or a combination of the expected read frequency and expected write frequency; and
   a read command corresponding to the range of logical addresses received from the host comprises the access frequency value.

4. The method of claim 2, wherein
   the read buffers in the free list are arranged according to a total read count for each of the read buffers;
   a first read buffer of the read buffers having a higher total read count is allocated for a new read command after a second read buffer of the read buffers having a lower total read count is allocated.

5. The method of claim 4, wherein the total read count for each of the read buffers is a sum of a read hit count, a NAND read count, and an assigned read count.

6. The method of claim 5, wherein a read buffer table stores, for each of the read buffers one or more of a range of logical addresses, a read buffer Identifier (ID), a type of buffer, the total read count, and a timestamp.

7. The method of claim 2, wherein
at least some of the read buffers in the free list are arranged according to a total read count for each of the read buffers;
a first read buffer of the read buffers having a higher total read count and an earlier timestamp is allocated for a new read command before a second read buffer of the read buffers having a lower total read count and a later timestamp is allocated.

8. The method of claim 2, wherein
the read buffers in the free list comprises a first group, a second group, and a third group;
the first group comprises first read buffers each corresponding to invalid data;
the second group comprises second read buffers each having an access frequency value corresponding to frequent writes and infrequent reads; and
the third group comprises third read buffers arranged according to a total read count for each of the third read buffers.

9. The method of claim 8, wherein
the third read buffers are allocated for new read commands after the first read buffers and the second read buffers are allocated; and
the second read buffers are allocated for new read commands after the first read buffers are allocated.

10. The method of claim 2, further comprising in response to determining that a range of logical addresses of a new read command is different from that of any of the read buffers in the free list:
allocating, by the controller, a first read buffer from the free list;
reading, by the controller, the data corresponding to the range of logical addresses of the new read command from a non-volatile memory of the storage device into the first read buffer; and
transferring, by the controller, the data from the first read buffer to the host.

11. The method of claim 10, wherein
the access frequency value is included in the new read command and corresponds to frequent reads and infrequent writes; and
the method further comprises:
assigning, by the controller, the first read buffer a high assigned read count;
transferring the data to the host; and
after transferring the data to the host, adding, by the controller, the first read buffer back to the free list according to a total read count of the first read buffer determined based at least in part on the high assigned read count.

12. The method of claim 10, wherein
the access frequency value is included in the new read command and corresponds to one or more of infrequent reads or frequent writes; and
the method further comprises:
transferring the data to the host; and
after transferring the data to the host, adding, by the controller, the first read buffer back to a position of the free list, wherein the position corresponds to a group of read buffers each having an access frequency value corresponding to frequent writes and infrequent reads.

13. The method of claim 10, wherein
the access frequency value is included in the new read command and corresponds to no frequency information provided or a typical number of reads and writes; and
the method further comprises:
transferring the data to the host; and
after transferring the data to the host, adding, by the controller, the first read buffer back to the free list according to a total read count of the first read buffer.

14. The method of claim 2, wherein in response to determining that the range of logical addresses of a new read command is the same as a range of logical addresses of a first read buffer of the read buffers in the free list, a read hit count of the first read buffer is increased.

15. The method of claim 14, wherein
the access frequency value is included in the new read command and corresponds to one or more of infrequent reads or frequent writes; and
the method further comprises:
transferring the data to the host; and
after transferring the data to the host, adding, by the controller, the first read buffer back to a position of the free list, wherein the position corresponds to a group of read buffers each having an access frequency value corresponding to frequent writes and infrequent reads.

16. The method of claim 14, wherein
the access frequency value is included in the new read command and corresponds to no frequency information provided or a typical number of reads and writes; and
the method further comprises:
transferring the data to the host; and
after transferring the data to the host, adding, by the controller, the first read buffer back to the free list according to a total read count.

17. The method of claim 14, wherein
the access frequency value is included in the new read command and corresponds to frequent reads and infrequent writes; and
the method further comprises:
transferring the data to the host; and
after transferring the data to the host, adding, by the controller, the first read buffer back to the free list according to a total read count.

18. A storage device, comprising:
a non-volatile storage; and
a controller configured to:
receive, from a host, information indicative of a frequency by which data stored in the storage device is accessed; and
in response to receiving the information, determine the order by which read buffers of the storage device are allocated for a next read command,
wherein each of the read buffers has a corresponding ID, and
wherein determining the order includes linking a next one of the read buffers to a previous one of the read buffers using the corresponding ID of the next one of the read buffers.

19. The storage device of claim 18, wherein each of the read buffers stores data corresponding to a range of logical addresses;
the information indicative of the frequency by which the data is accessed comprises an access frequency value for the range of logical addresses of each of the read buffers; and the controller is further configured to arrange the read buffers in a free list based, at least in part, on the access frequency value corresponding to each of the read buffers.

20. A non-transitory computer-readable media comprising computer-readable instructions, such that, when executed, causes a processor to:
receive, from a host, information indicative of a frequency by which data stored in the storage device is accessed; and
in response to receiving the information, determine the order by which read buffers of the storage device are allocated for a next read command,
wherein each of the read buffers has a corresponding ID, and
wherein determining the order includes linking a next one of the read buffers to a previous one of the read buffers using the corresponding ID of the next one of the read buffers.

* * * * *